(12) United States Patent
Belair et al.

(10) Patent No.: US 7,548,972 B2
(45) Date of Patent: Jun. 16, 2009

(54) METHOD AND APPARATUS FOR PROVIDING LIKELY UPDATES TO VIEWS OF GROUP MEMBERS IN UNSTABLE GROUP COMMUNICATION SYSTEMS

(75) Inventors: Stephan P. Belair, Santa Cruz, CA (US); Satisha K. Bhat, Cupertino, CA (US); Venkatasiva Mortala, Fremont, CA (US); Sudhakar Mamillapalli, San Jose, CA (US); Matthew F. Williams, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 1158 days.

(21) Appl. No.: 10/279,457

(22) Filed: Oct. 23, 2002

(65) Prior Publication Data
US 2004/0081149 A1   Apr. 29, 2004

(51) Int. Cl.
*G06F 15/173* (2006.01)
(52) U.S. Cl. .................. 709/224; 370/260; 370/390; 370/394; 370/432
(58) Field of Classification Search ......... 709/204–206; 370/260–261, 390, 394, 432
See application file for complete search history.

(56) References Cited

U.S. PATENT DOCUMENTS

| 5,473,642 | A | | 12/1995 | Osawa et al. | |
|---|---|---|---|---|---|
| 5,905,871 | A | * | 5/1999 | Buskens et al. | 709/245 |
| 6,247,059 | B1 | * | 6/2001 | Johnson et al. | 709/237 |
| 6,639,608 | B1 | * | 10/2003 | Itakura | 715/738 |
| 7,346,699 | B1 | * | 3/2008 | Krause et al. | 709/232 |
| 2002/0099773 | A1 | * | 7/2002 | Tsuru | 709/204 |
| 2003/0031175 | A1 | * | 2/2003 | Hayashi et al. | 370/390 |

(Continued)

FOREIGN PATENT DOCUMENTS

EP   0698975 A2   2/1996

(Continued)

OTHER PUBLICATIONS

"Reliable Multicast Transport Protocol (RMTP)" by S. Paul et al., IEEE Journal on Selected Areas in Communications, vol. 15, No. 3, Apr. 1997.*

(Continued)

*Primary Examiner*—Kenny S Lin
*Assistant Examiner*—Tauqir Hussain
(74) *Attorney, Agent, or Firm*—Hickman Palermo Truong & Becker LLP

(57) ABSTRACT

A method is disclosed for providing likely updates to views of group members in unstable group communication systems. A group message is received from a sender associated with a sending node in a network. The group message includes a message view having a counter and an acknowledgment set. The acknowledgment set identifies one or more receiving nodes to which the group message is directed. Issuance of an acknowledgment of the group message to the sending node is deferred. The group message is delivered to the receiving nodes. An acknowledgment of the message is received from one of the receiving nodes. The message view is updated by removing each receiving node that issues an acknowledgment from the acknowledgement set. The updated message view is provided to the sender.

28 Claims, 5 Drawing Sheets

U.S. PATENT DOCUMENTS

| | | | |
|---|---|---|---|
| 2003/0131073 A1* | 7/2003 | Lucovsky et al. | 709/219 |
| 2004/0027995 A1* | 2/2004 | Miller et al. | 370/254 |
| 2006/0114848 A1* | 6/2006 | Eberle et al. | 370/312 |
| 2006/0161554 A1* | 7/2006 | Lucovsky et al. | 707/10 |
| 2006/0203819 A1* | 9/2006 | Farinacci et al. | 370/390 |

FOREIGN PATENT DOCUMENTS

| | | |
|---|---|---|
| WO | WO 02/23814 A | 3/2002 |

OTHER PUBLICATIONS

Werner Vogels, "The Horus Papers, Publications," file://C:\DOCUME~1\CHRISP~1\LOCALS~1\Temp\ZB79T8VC.htm, printed Feb. 12, 2003, pp. 1-6.

Werner Vogels, "World Wide Failures," www.cs.cornell.edu/Info/Projects/HORUS/Papers.html, 4 pages.

Werner Vogels et al., "Support for Complex Multi-Media Applications using the Horus System," Dec. 1994, http://cs.cornell.edu/Info/People/rvr/papers/rt/novsday.html, printed Feb. 12, 2003, 8 pages.

Anonymous, "ISIS Publications List," http://www.cs.cornell.edu/Info/Projects/ISIS/ISISpapers.html, printed Feb. 12, 2003, pp. 1-5.

PCT International Search Report from the International Searching Authority for the PCT International Application No. PCT/US03/32664, 6 pgs.

Current Claims in PCT Patent Application No. PCT/US03/32664, 4 pgs.

State Intellectual Office of the People's Republic of China, "The First Office Action," App. No. 200380102079.9, dated Nov. 24, 2006, 8 pages.

Current Claims, CA App. No. 200380102079.9, 4 pages.

* cited by examiner

METHOD AND APPARATUS FOR PROVIDING LIKELY UPDATES TO VIEWS OF GROUP MEMBERS IN UNSTABLE GROUP COMMUNICATION SYSTEMS

FIELD OF THE INVENTION

The present invention generally relates to telecommunications networks. The invention relates more specifically to a method and apparatus for providing likely updates to views of group members in unstable group communication systems.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Reliable Group Communication

Certain telecommunications systems comprise a distributed plurality of processing nodes, and offer reliable multicast group communication. In these systems, group communication is implemented over a multicast framework, and a transport layer guarantees reliable delivery of multicast messages. In this context, the term "distributed application" refers to applications that implement group communication. Therefore, a distributed application is as an application that consists of the set of all associated programs running in different nodes of the system, communicating through group communication.

Conceptually, each node in the distributed system consists of applications that interface to a group messaging layer. The group messaging layer maintains information representing the concept of a group, and has a presence on every node of the system. The group messaging layer is responsible for the in-order delivery of messages to members of a group that are local to the group messaging layer, as well as delivering messages from its members to other members on the same or remote nodes in the system.

The group messaging layer logically interfaces to a transport layer that implements the reliable delivery of group messages. That is, the reliability of multicast messages is implemented by a transport subsystem that manages the acknowledgement of the reception of a message at a node, the retransmission of a message, and performs other operations. Each layer may be implemented as one or more software elements, firmware elements, hardware elements, or a combination thereof.

In order to guarantee reliable delivery, the transport layer can determine how many acknowledgements to expect for a message that is multicast. Therefore, in order to implement reliable delivery of multicast messages, the sender of a message may need to know how many nodes to which the message is targeted, since this will be the number of nodes from which it can expect acknowledgements. That is, if the sender of a message wants to be guaranteed that a set of nodes containing members in a group actually received a message, then the number of nodes in the set is the number of acknowledgements it will expect to receive. However, in past approaches the transport layer makes no provision for actually tracking the values and not just the number of elements of such a set.

Group Views

A member's view of a group reflects the understanding, of that member, about which nodes and how many members are in the group. In some systems, the group view actually may extend to knowing which members are in the group. Thus, the group view reflects the knowledge of the membership of the group. In this context, members of the view are processing nodes.

Many distributed applications employing group communication comprise asynchronous distributed processing nodes. Each node is essentially independent from all other nodes, and performs processing according to its own schedule or based on its own clock. Thus, the nodes are decoupled.

In such systems, failures such as communications outages or process crashes can occur, and therefore the system is inherently unreliable or unstable. Further, delays in message delivery in such an asynchronous system do not allow the sender to conclude that there has been a communication failure or a process crash. The members of a group may change, or a group may undergo reconfiguration, during such failures. A fundamental problem involves how to provide reliable communication among nodes in such unstable group communication systems. To provide such communication, nodes in the system must communicate messages directed to determining whether a prior message was properly delivered. However, no synchronous channel is available in the system for such messages; indeed, the messaging relating to verifying message delivery is itself subject to unreliability.

Prior solutions to these problems have been attempted, but in general, such solutions all limit, to some extent, the degree of asynchronous behavior that is available in the system. For example, in a virtual synchrony approach, the underlying infrastructure for group communication can enforce stable group views. This means that the sender of a message to a group can be sure that the message will be delivered to the sender's view of the group and that the group membership will not change while the message is sent.

In group communication systems that use virtual synchrony, while a group is reconfiguring and its membership is changing, e.g., in response to an outage or crash, group messaging is suspended. A suspension is imposed because any group views during this period are inherently unstable. Accordingly, a group is not allowed to reconfigure or change membership while messages are being exchanged. This approach affords distributed applications the assurance that a known set of group members will receive a message multicast to the group. Furthermore, whenever a sender sends messages that require responses, the sender knows how many responses to expect and from whom they can be expected, since virtual synchrony provides reliable and stable group views.

Problem Areas

However, implementing stable group views for group communication with virtual synchrony is costly in terms of message overhead, measured as the number of messages that must be exchanged in order to enforce virtual synchrony, and as the delay to the application that cannot send messages while group views are updated. Specifically, several rounds of reliable message exchange are required while changes in group views are propagated and agreed upon. During this time, changes in group membership are suspended. This excessively limits or delays ongoing group communication. In particular, in certain systems, the overhead of maintaining stable group views is too high, and making changes to group membership mutually exclusive with group messaging is unacceptable.

For example, certain systems have high bandwidth requirements for group communication. An example is a high-speed data packet router comprising multiple processing nodes that are distributed over a high-speed mesh. As a result of these requirements, long delays in sending messages are unacceptable. Further, in certain systems, messaging must be timely enough to convey system information, and these systems cannot tolerate delays in group communication while a group view is stabilized. The latter condition applies to systems that employ group communication to exchange critical information in real time.

Still other systems must recover from outages in times that are less than that required for the exchange of multiple rounds of reliable group messages. Therefore, if any outages result in a change to a group membership or topology, the group views have to be updated and the system cannot afford this time. Thus, if the maximum time allowed for the recovery from network outages, crashed nodes or processes is smaller than that required for the time for a group to reach agreement upon its new configuration, then the system cannot promise stable group views to its distributed applications.

Based on these reasons or others, certain systems must tolerate unstable group views, and a greater burden is placed upon the distributed application in these systems. In such systems, the sender of a message might send a message to a set of group members as defined by its group view, and the group membership can change while the message is being delivered. This can have negative side effects for the sender of the message.

For example, if the sender is expecting responses from the members of the group to which it sent the message, then presumably, it must dimension response memory for the responses to match what it perceives as the group membership at that time. Therefore, if some members departed the group while the message was being sent, the transport layer may give up on trying to reliably deliver the message to all nodes in the group, after one or many retransmissions, returning an error to the sender of the message.

In these types of failures, the sender is stalled while a maximum specified time is consumed waiting for responses from nodes that may no longer be in the group, because the group reconfigured while the message was sent. The sender's view of the group is now untrustworthy, and the sender may have to take extra measures to determine which members actually received a message. This scenario is termed the "uncertain known member" scenario, since the sender of the message cannot know if the member left the group, or there was an outage while a message was being delivered to the group. The sender must either wait for messages, or send more messages in order to be able to determine the scenario.

Another hazard for a distributed application operating with unstable group views is that the application may inadvertently send the message to new members who joined the group while the message was being delivered. This can occur, for example, when a group is reconfiguring while the application is sending a message; since the sender's group view was not updated, any new members that arrived while delivery of the message may have received the message. This is termed the "unannounced new member" scenario, and may cause ambiguous results.

For example, if the message is delivered to the unannounced new members, then transport layers of the new members' node will acknowledge its receipt. This would have the side effect that some known members might not receive the message, since the transport layer on the sending node will prematurely receive all the acknowledgements that it was expecting. The problem with the unannounced new member scenario is that the sender no longer knows if all the members received the message, and it may not even be aware that there is a problem.

A sending node can detect the problem if it expects responses to a message that it sent to its group view. The unannounced member may respond to the message along with all members that are in its group view. However, the sender probably will not have reserved memory for all known members and unannounced members, and therefore the sender will drop any responses that arrive after it receives the amount it was expecting.

All of these effects introduce significant uncertainty in the distributed application. The basis of the uncertainty is that the group views are inherently unstable. A method is sought that can provide a more deterministic environment in systems which can not enforce stable group views.

In past approaches, this problem is not addressed. The past approaches always assume that group communication is stable.

Based on the foregoing, there is a need for a way to provide reliable group communication, and timely updates to group views, in systems that cannot implement stable group communication.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
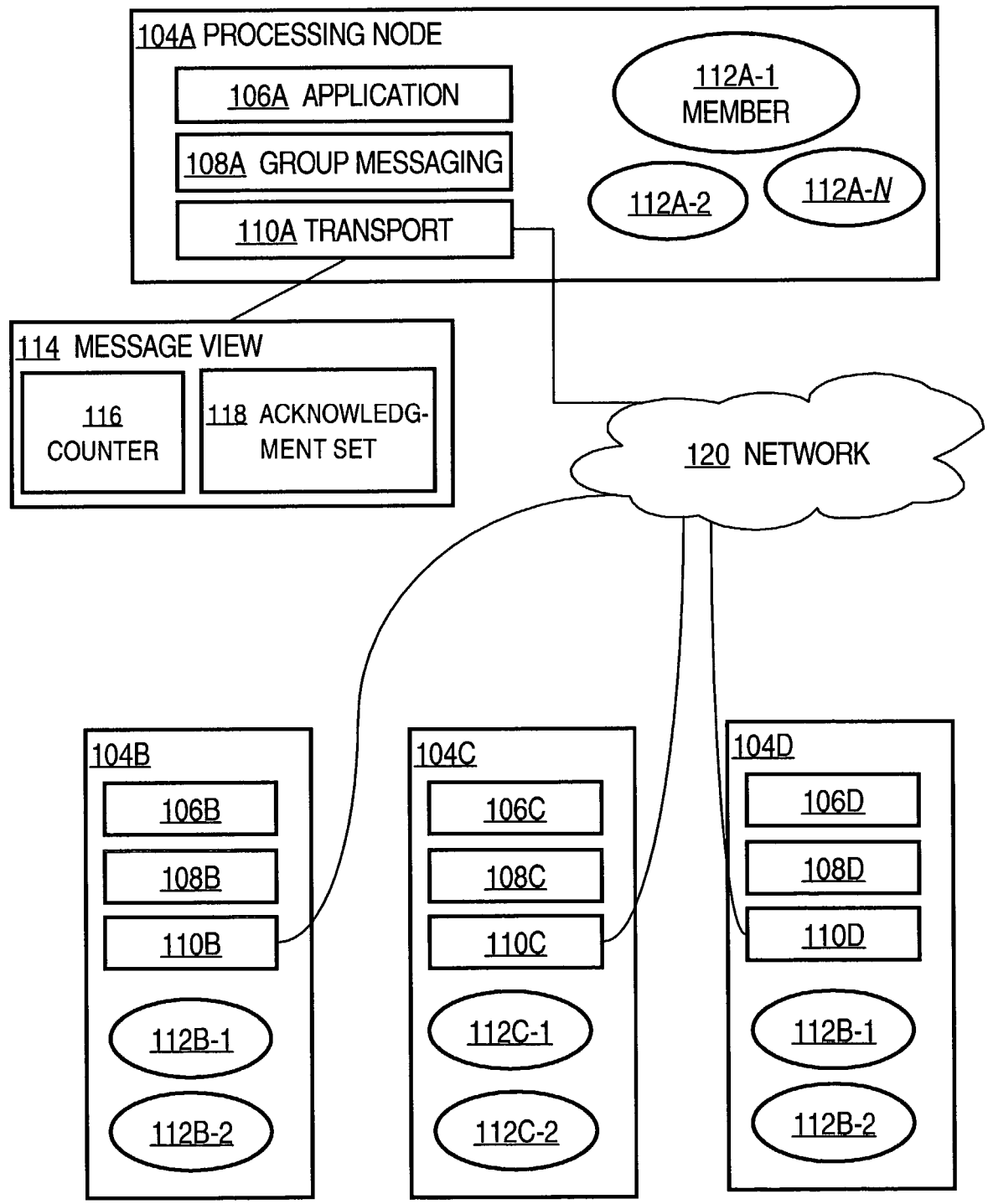
FIG. 1 is a block diagram that illustrates an overview of a group communication system.

A method and apparatus for providing likely updates to views of group members in unstable group communication systems is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Mechanisms—Hardware Overview
4.0 Extensions and Alternatives 1.0 General Overview The needs identified in the foregoing Background, and other needs and objects that will become apparent for the following description, are achieved in the present invention, which comprises, in one aspect, a method for providing updates to group views of group members in unstable group communication systems. A group message is received from a sender associated with a sending node in a network. The group message includes a message view having a counter and an acknowledgment set. The acknowledgment set identifies one or more receiving nodes to which the group message is directed. Issuance of an acknowledgment of the group message to the sending node is deferred. The group message is delivered to the receiving nodes. An acknowledgment of the message is received from one of the receiving nodes. The message view is updated by removing each receiving node that issues an acknowledgment from the acknowledgement set. The updated message view is provided to the sender.

In general, embodiments provide a processing mechanism that can be employed in distributed systems offering reliable multicast for group communication and which cannot offer stable group views. In one approach herein, group views are frozen for the scope of a message. This approach offers a greater degree of stability to the distributed application. In the disclosed approach, a group messaging layer on the sending node provides its transport layer with the acknowledgement set for a message. On the receiving nodes for a message, the acknowledgement is deferred until the transport layer is given the count of members to which the message was delivered. This count is returned to the source node along with the acknowledgment. The originating transport layer returns to the sender the count of members delivered to and the remaining acknowledgment set, which may or may not be empty.

Using enhanced acknowledgement semantics implemented at the transport layer, feedback is returned to the sender of a group message, so that a view of a group can be obtained for the scope of a message. Such message views, as described herein, allow an application or sender to dynamically obtain a probable snapshot of a group and aid in implementing the application semantics. Further, message views enable updating the view of a group in systems that cannot guarantee stable views for group communication.

Thus, the techniques herein add view information onto the application message stream. A transport layer partially provides a group membership service while reliably delivering application messages. Thus, application views can be updated without requiring dedicated messages to determine the then-current group membership.

Embodiments are broadly applicable to any systems offering group communication that cannot meet the constraints of stable groups and use group communication. Embodiments are also applicable to any system in which the time required to determine whether a message has been properly transmitted, which may include the maximum timeout value applied by the transport layer, exceeds the maximum interval allowed for critical processing decisions that use group communication.

In other aspects, the invention encompasses a computer apparatus and a computer readable medium configured to carry out the foregoing steps.

2.0 Structural and Functional Overview

According to one embodiment, group communication is addressed in systems that are inherently unstable with respect to group views. In one approach, unstable group views are replaced with a more fleeting message view. With message views, the distributed application accepts the paradigm that the group view is unstable. While a group member is exchanging messages with members in its view, it can obtain feedback from the transport layer allowing it to obtain some certainty as to the accuracy of its view and of potential view changes.

FIG. 1 is a block diagram that illustrates an overview of a group communication system. A plurality of processing nodes 104A, 104B, 104C, 104D are communicatively coupled to a network 120. A first processing node 104A comprises an application layer 106A, group messaging layer 108A, and transport layer 110A. Each such layer comprises one or more software elements, firmware, or hardware elements, or a combination thereof. A suitable host processor executes instructions that comprise the layers. First processing node 104A also comprises one or more group members 112A-1, 112A-2, 112A-N. Each group member may comprise any form of computer-executed process, including application processes, operating system processes, etc. Additional processing nodes 104B, 104C, 104D are similarly structured with respective application layers, group messaging layers, and transport layers.

Application layers 106A, 106B, 106C, 106D are sources of messages. Thus, each application layer may be associated with one or more processes or applications that send or receive messages to group members at other nodes. Group members themselves also may be processes or applications.

Transport layers 110B, 110c, 110D are communicatively coupled to network 120. In this arrangement, all the transport layers 110A, 110B, 110C, 110D are indirectly connected, and cooperate to provide a reliable multicast message delivery mechanism for messages that ultimately originate or terminate in an application layer or group messaging layer of a node, as described further herein. Any suitable reliable transport-layer protocol may be used to facilitate message communication among transport layers 110A, 110B, 110C, 110D. For example, TCP may be used. Each transport layer 110A, 110B, 110C, 110D can receive application messages from other transport layers and can issue acknowledgement messages in the manner described further below. An acknowledgment message informs a sending transport layer that a receiving transport layer has received the application message.

Nodes 104B, 104C, 104D also have one or more group members. Each such node may have any number of group members.

In one specific embodiment, processing nodes 104A, 104B, etc. all are elements of a high-speed network packet router device. In this embodiment, network 120 is an internal network managed within the device, or its bus. Nodes may be line cards, route processors, or other computing nodes. Each may have its own processor, kernel, operating system, and application, but can operate as a peer with respect to any other node and form groups with them. Other embodiments may be provided in any form of distributed computing environment in which group membership is unstable.

For purposes of illustrating a clear example, FIG. 1 shows four (4) processing node, three group members in node 104A, and two group members in nodes 104B, 104C, 104D However, in other embodiments, there may be any number of processing nodes, and each node may have any number of group members. The number of group members in a node may change over time.

Figure 2:
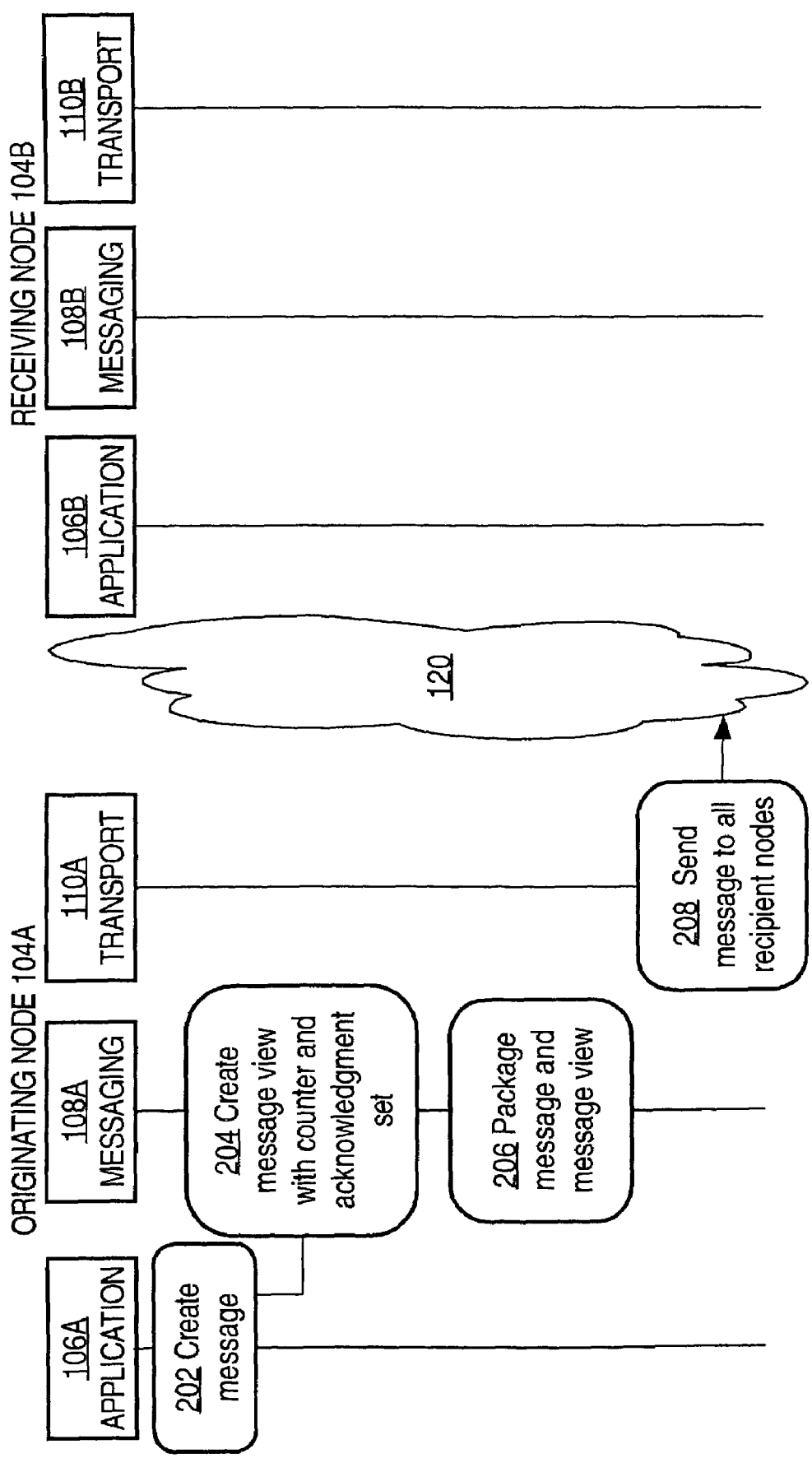
FIG. 2 is a process diagram that illustrates a high level overview of one embodiment of a method for sending messages in a group communication system.
Figure 3:
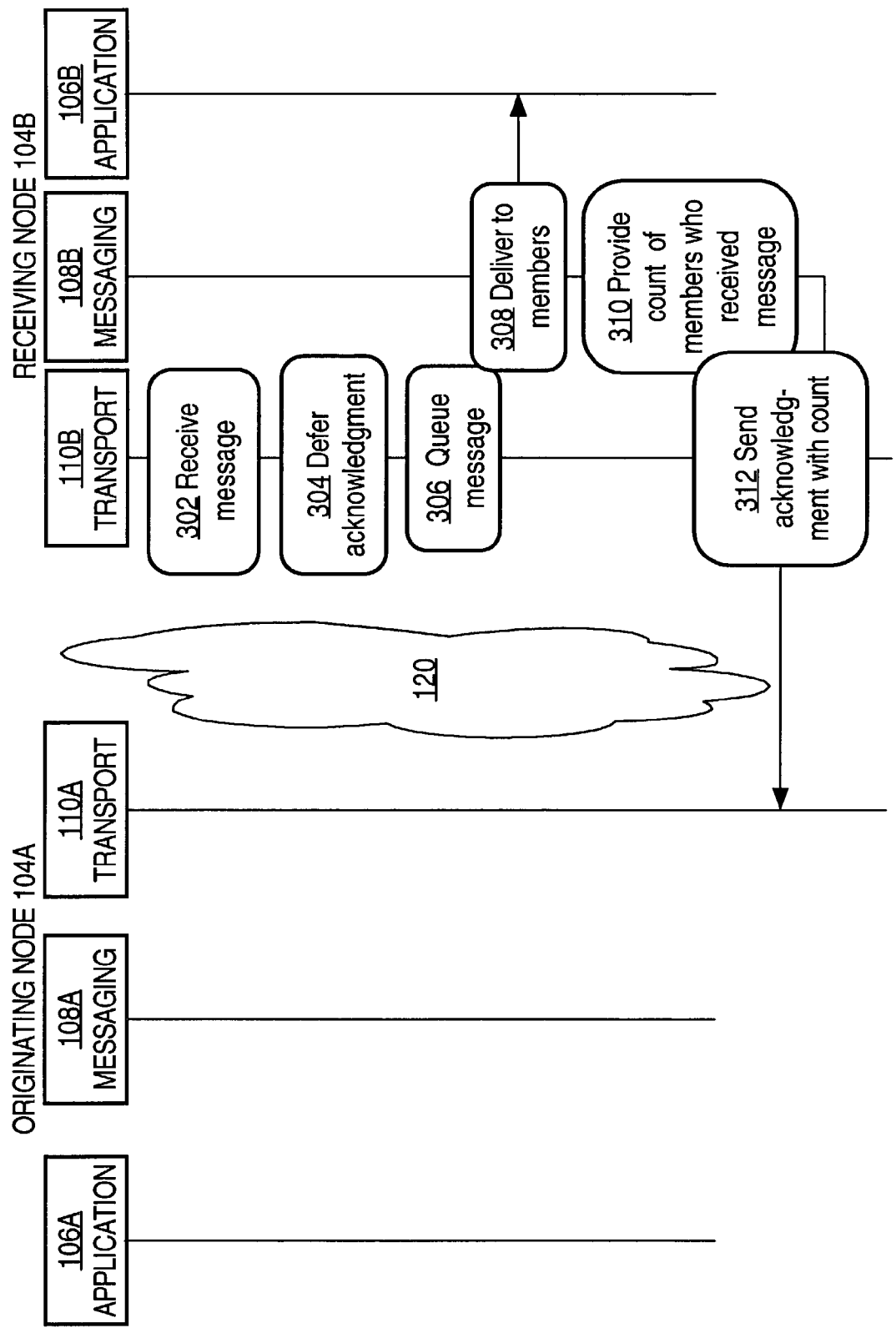
FIG. 3 is a process diagram that illustrates a method for receiving and acknowledging messages in a group communication system.
Figure 4:
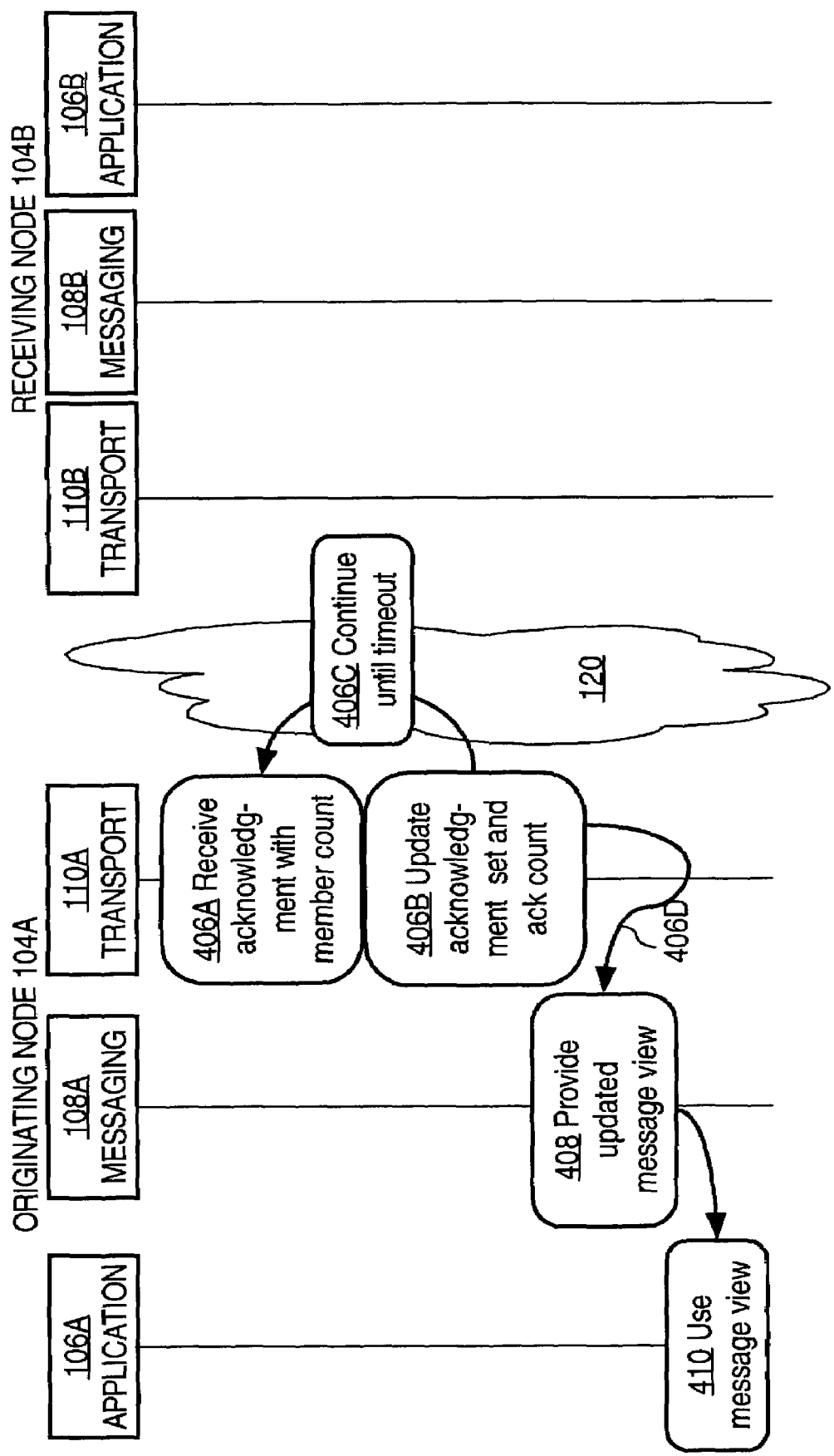
FIG. 4 is a process diagram that illustrates a method for receiving and using updated message views in a group communication system.

FIG. 2 is a process diagram that illustrates a high level overview of one embodiment of a method for sending messages in a group communication system. FIG. 3 is a process diagram that illustrates a method for receiving and acknowledging messages in a group communication system. FIG. 4 is a process diagram that illustrates a method for receiving and using updated message views in a group communication system. For purposes of illustrating a clear example, FIG. 2, FIG.

3, and FIG. 4 are now described in the context of the system of FIG. 1. This description assumes that processing node 104A of FIG. 1 is originating messages to one or more other nodes (termed "receiving nodes"). In addition, for clarity, operations performed by only one receiving node 104B are described; however, any other receiving node may perform such operations.

In the approach described herein, each messaging layer and transport layer implement special communication semantics. Referring now to FIG. 2, in block 202, a message is created at application layer 106A. The specific form and content of the message are not critical. Any application, member, processing node, etc., may create the message.

At block 204, a message view that includes a counter and an acknowledgment set is created at messaging layer 108. As shown in FIG. 1, a message view 114 comprises a counter 116 and an acknowledgment set 118; the message view also may include a list of known members in the group. In one embodiment, a message view is created at the transport layer but is persistently associated with an application or sender in the application layer; alternatively, the message view is associated with the group messaging layer.

The term "message view" is selected because from the perspective of an application, or other sender at application layer 106A, the list of known members may change from message to message, and in approaches herein the view may be updated from message to message. In contrast, a group view as used in systems with virtual synchrony presents the same view of a group across all messages, until the membership changes, during which the application message stream is halted.

In prior approaches, a messaging layer informs a transport layer that a message is for reliable delivery, and indicates the number of acknowledgements that must be received from group members of receiving nodes, through the transport layers of the receiving nodes, in order to satisfy the guarantee of reliable delivery. This presumes that a view of members of the group is visible to all group messaging layers in the system, and that the transport layers are not aware of the composition of groups in the system.

In the approach herein, however, information beyond the number of expected acknowledgements is supplied to the transport layer. The messaging layer on the originating node also provides a view of the group in the form of message view 114. Counter 116 holds a count of the number of acknowledgments received to a sent message. Additionally or alternatively, counter 116 may hold a count of all members at one or more nodes to which the message was delivered. Acknowledgment set 118 comprises information identifying the set of nodes, such as processing nodes 104B, 104C, 104D, to which a sender, such as processing node 104A, is sending a message. The acknowledgment set 118 can be expressed in any data representation that is agreed-upon by all transport layers 110A, 110B, 110C, 110D that implement the reliable group communication.

Referring again to FIG. 2, in block 206, the messaging layer 108A of the originating node 104A encapsulates or packages the message and message view, and provides them to transport layer 110A. In block 208, transport layer 110A sends the message and message view through network 120 to one or more receiving nodes.

Referring now to FIG. 3, in block 302, the message is received at transport layer 110B of an example receiving node 104B. In a conventional system, the transport layer 110B would acknowledge receipt of the message by immediately sending an acknowledgment back to transport layer 110A. However, if one or more group members 112B-1, 112B-2 did not receive the message or if the group membership changed or was undergoing reconfiguration, then in such a conventional system transport layer 110A and its associated originating node 104A would have an inaccurate view of the group. Accordingly, in embodiments herein, issuing an acknowledgment by transport layer 110B is deferred, as shown by block 304.

Transport layer 110B then queues the message for delivery by messaging layer 108B, as shown by block 306. From the standpoint of transport layer 110B, queuing the message is equivalent to delivery to the receiving application layer. In block 308, messaging layer 108B delivers the message to one or more group members 112B-1, 112B-2 at application layer 106B. In performing the delivery operation, messaging layer 108B acquires a count of the then-current number of group members at application layer 106B to which the message was delivered. To obtain the count, messaging layer 108B may call into transport layer 110B after delivering the message, instructing the transport layer to generate an acknowledgment with the local count of messages to which the message was delivered. Thus, an interface is created between the messaging layer and transport layer so that the messaging layer can instruct the transport layer when to generate an acknowledgment; further, the acknowledgment has a count associated with the message to be acknowledged.

At block 310, messaging layer 108B provides the count of members that received the message to transport layer 110B. In block 312, transport layer 110B sends a deferred acknowledgment back to transport layer 110B, and includes the count of members.

Referring now to FIG. 4, in block 406A, transport layer 110A receives the acknowledgment message from transport layer 110B including the count of members at receiving node 104B that received the message. The count is added to the counter 116 associated with transport layer 110A such that counter 116 is an accumulator. In block 406B, transport layer 110A updates the acknowledgment set 118 of its message view 114 by removing information identifying node 104B from the acknowledgment set.

If transport layer 110A dispatched the message to other receiving nodes as part of block 208 in FIG. 2, then transport layer 110A waits to receive other acknowledgments from those nodes for a specified time. Thus, as indicated by block 406C, receiving acknowledgments and updating the acknowledgment set 118 in the message view 114 continues as other nodes respond. Transport layer 110A also accumulates counter 116 of message view 114 as acknowledgments are received.

Optionally, as part of block 406C, transport layer 110 generates one or more retransmissions of the message at a specified interval; this provides the message to nodes that may have failed to acknowledge because they are temporarily unavailable or down, but that restart or become available during the specified interval. The specified time used for determining a timeout in block 406C may vary according to the requirements of a particular system. As a non-limiting example, the specified time may be any value between about 1 second and about ten (10) seconds. Any number of retransmissions separated by any time interval may be performed as part of block 406C.

At this point, counter 116 of the message view contains a fully updated count indicating the total number of acknowledgments that were received. Additionally or alternatively, counter 116 may store the number of members that received the message. Further, acknowledgment set 118 contains a list of only those group members that did not receive or failed to acknowledge receiving the message. As indicated by arrow

406D, when all acknowledgments are received or the specified interval or timeout occurs, transport layer 110A sends the updated message view to messaging layer 108A. In block 408, the messaging layer 108A provides the updated messaging view to application layer 106A. In block 410, an application or other sender at application layer 106A uses the message view as appropriate for that application or sender.

Thus, in this approach, the transport layer on the node that originated the message determines when the message is reliably delivered. The determination is made by counting the acknowledgements that arrive for the message, and generating retransmissions of the message at predetermined intervals. After a specified maximum time, the transport layer determines whether the message was reliably delivered. This decision is returned to the sender of the message.

As each acknowledgement arrives from a receiving node, the originating transport layer counts the acknowledgement, and removes the acknowledging node from the acknowledgement set of nodes. Furthermore, if any acknowledgements arrive from nodes that are not in the acknowledgment set, they are ignored. Acknowledgements are only processed if they are received from nodes in the acknowledgement set.

Thus, when a message is reliably delivered to all nodes, the number of nodes in the expected acknowledgement set becomes zero after all acknowledgments have been received. Further, conversely, when the transport layer cannot verify reliable delivery and indicates a failure to the sender of the message, the transport layer is aware of which nodes did not respond to the message because such non-responding nodes remain in the acknowledgement set. A list of the failed nodes for the message can be returned to the sender, based on the nodes left in the acknowledgement set. The sender can then update its view of the group by either removing the unresponsive nodes from its view, or alternatively, by moving the unresponsive nodes to a transitional view for the group (associated with a condition of "remove notification pending") or to a questionable view for the group (associated with a condition of "crash notification pending").

Because the group communication is reliable, the transport layer of each node that receives the multicast message is required to generate an acknowledgement upon receipt of the message. However, in the approach herein, each such acknowledgement is deferred until feedback is received from the upper messaging system identifying the number of members of the group on that node to which the message was delivered. In the acknowledgement that is sent back to the node that originated the message, the number of members to which the message was delivered is sent back with the acknowledgment. Thus, by deferring the acknowledgment, other feedback can be incorporated with the acknowledgement.

Thus, in the approach herein, the transport layer of the originating node collects a count of members in the group to which the message was delivered, as well as a count of the acknowledgments and which nodes did or did not respond. Any node elements left in the acknowledgement set represent nodes that may no longer be in the group. All of this feedback can be returned to the sender of the message.

The sender of a message may use the feedback information in several ways. The acknowledgment set enables the sender to modify its view of what nodes are present in a group. For example, a group view maintained by the sender may have changed in the time between messages, resulting in a "disappearing known node" scenario. Based on a message view it receives, when dispatching a subsequent message, the sender may omit the nodes identified in the acknowledgment set, because any node elements left in the acknowledgement set represent nodes that may have left the group.

For example, assume that a message view of a particular application contains an acknowledgment set that identifies N nodes. This message view indicates that the application expects to receive N acknowledgments to each message sent to the group. Assume further that only M acknowledgments are received in a specified time, where M<N. As a result, K nodes are known to be unresponsive, where K+M=N. The acknowledgment set will contain K nodes. The K nodes may have crashed or experienced busy conditions. The application can update a group view to include only M nodes.

Further, since the acknowledgment set is provided to the transport layer on the originating node, the message is unaffected by any unannounced new nodes. If any new nodes joined the group since the message was sent, the joining nodes are not in the acknowledgment set. Therefore, if the joining nodes received the message and their transport layers generated acknowledgments, such acknowledgments are not processed at the originating node, because the joining nodes were not in the acknowledgement set. Accordingly, any new unannounced nodes do not disturb the scope of messages that are in progress when they join the group.

In addition, each message view contains a count of the number of members to which the message was delivered. If the sender is expecting responses to the message from group members, the sender can use the count of a message view to accurately allocate memory for use in storing responses from group members. Further, the sender may deduce that a receiving member process crashed by reviewing the count of members, before it receives a membership change notification from a node associated with that member.

Implementations may be used in the operating system of any distributed computing system. In one specific embodiment, a high-capacity data packet router is structured as a distributed system having an operating system that includes the functionality described herein. Distributed applications can execute in such a platform and can communicate through group communication.

Unlike prior approaches, group communication is provided in an unstable environment. As a result, group communication may be used in systems and environments having constraints that cannot support the trade-offs involved in virtual synchrony or other prior approaches. For example, systems constrained to limited times for coming to agreement with respect to delivery of messages, can now use group communication. The disclosed solution offers a form of stability appropriate for use in systems that must use group communication and cannot implement stable group views. Fundamentally, applications may maintain likely views of groups and act upon them. In the absence of message views, such systems could either not recover from outages that brought the membership of a group into question, or could not offer reliable group communication.

3.0 Implementation Mechanisms—Hardware Overview

Figure 5:
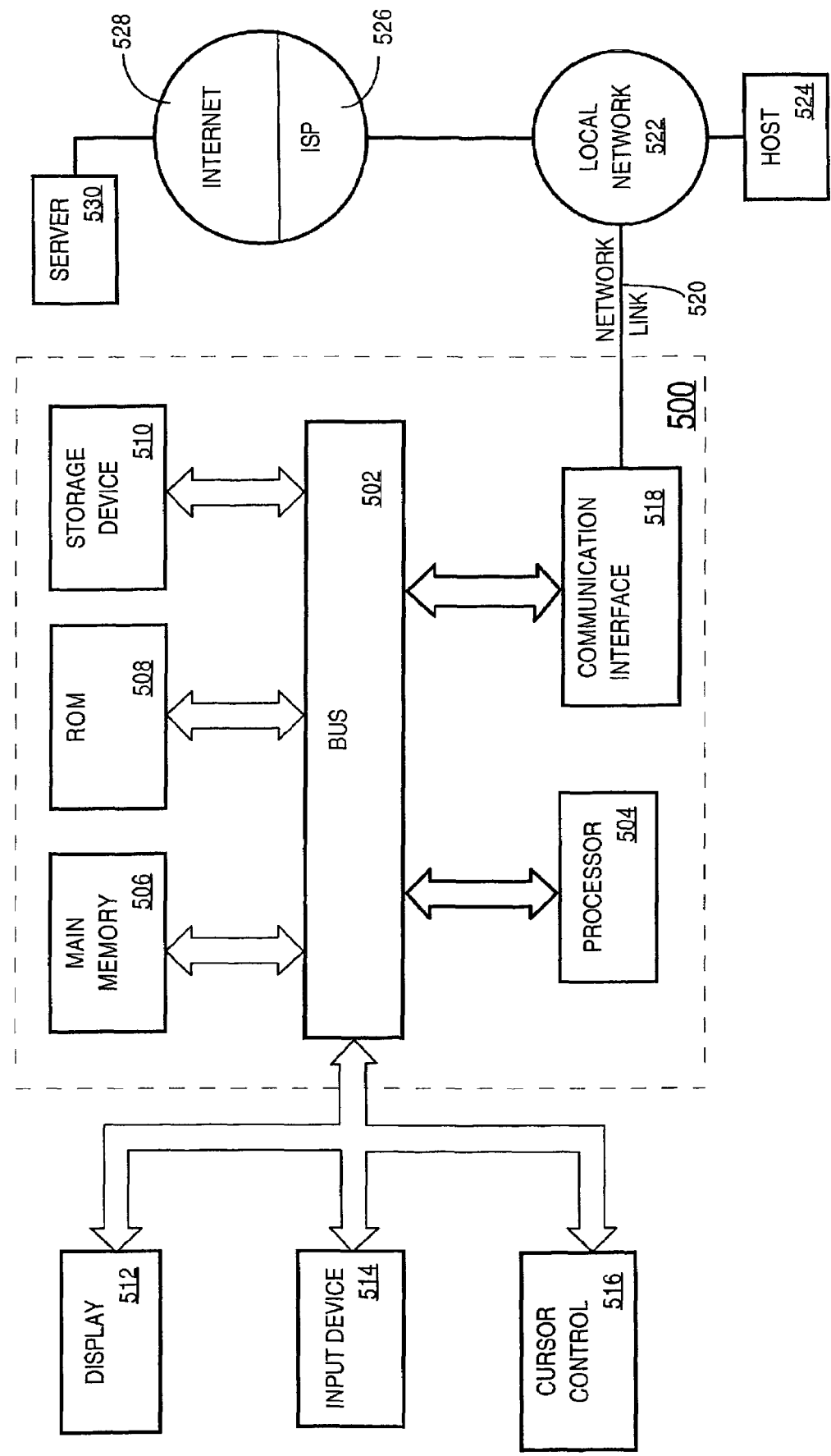
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for providing likely updates to views of group members in unstable group communication systems. According to one embodiment of the invention, providing likely updates to views of group members in unstable group communication systems is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile storage media, volatile storage media, and transmission media. Non-volatile storage media includes, for example, optical or magnetic disks, such as storage device 510. Volatile storage media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for providing likely updates to views of group members in unstable group communication systems as described herein.

Processor 504 may execute the received code as it is received, and/or stored in storage device 510, or other non-volatile storage for later execution. In this manner, computer system 500 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing updates to views of group members in unstable group communication systems, the method comprising the computer-implemented steps of:

a receiving node receiving a group message from a sender associated with a sending node in a network, wherein the group message includes a message view having a counter and an acknowledgment set, wherein the acknowledgment set contains information that identifies one or more receiving nodes to which the group message is directed;

wherein a receiving node is a processing node that comprises one or more group members;

deferring issuance of an acknowledgment of the group message to the sending node;

delivering the group message to the one or more group members;

receiving an acknowledgment of the group message from one of the receiving nodes;

updating the message view by removing, from the acknowledgment set, information that identifies each receiving node that issues an acknowledgment;

determining a number of group members of one of the receiving nodes that received the message;

updating the message view by incrementing the counter to the number of group members that received the message; and providing the updated message view to the sender.

2. A method as recited in claim 1, further comprising the steps of periodically re-transmitting the message to all nodes then currently in the acknowledgment set.

3. A method as recited in claim 1, further comprising the steps of periodically re-transmitting the message to all nodes that fail to acknowledge the message in a specified time.

4. The method as recited in claim 1, further comprising the step of repeating the steps of receiving an acknowledgment of the message from one of the receiving nodes and updating the message view a plurality of times in a specified period.

5. The method as recited in claim 1, wherein the message view is created at a group messaging layer associated with the sending node.

6. The method as recited in claim 1, wherein the message view is associated with a message that is received from an application layer of the sending node.

7. A method as recited in claim 1, further comprising the steps of:

creating the message at a sender in an application layer of the sending node;

dispatching the message from the application layer to a group messaging layer of the sending node;

creating the message view and associating the message view with the message;

sending the message with the message view to the recipient nodes;

receiving the updated message view at the sender; and performing a specified application operation based on the updated message view.

8. A computer-readable storage medium carrying one or more sequences of instructions for providing updates to views of group members in unstable group communication systems, which instructions, when executed by one or more processors, cause the one or more processors to carry out the steps of:

a receiving node receiving a group message from a sender associated with a sending node in a network, wherein the group message includes a message view having a counter and an acknowledgment set, wherein the acknowledgment set contains information that identifies one or more receiving nodes to which the group message is directed;

wherein a receiving node of the one or more receiving nodes is a processing node that comprises one or more group members;

deferring issuance of an acknowledgment of the group message to the sending node;

delivering the group message to the receiving nodes;

receiving an acknowledgment of the group message from one of the receiving nodes;

updating the message view by removing, from the acknowledgment set, information that identifies each receiving node that issues an acknowledgment;

determining a number of group members of one of the receiving nodes that received the message;

updating the message view by setting the counter equivalent to the number of group members that received the message; and providing the updated message view to the sender.

9. A computer-readable storage medium as recited in claim 8, further comprising the steps of periodically re-transmitting the message to all nodes then currently in the acknowledgment set.

10. A computer-readable storage medium as recited in claim 8, further comprising the steps of periodically re-transmitting the message to all nodes that fail to acknowledge the message in a specified time.

11. A computer-readable storage medium as recited in claim 8, further comprising the step of repeating the steps of receiving an acknowledgment of the message from one of the receiving nodes and updating the message view a plurality of times in a specified period.

12. A computer-readable storage medium as recited in claim 8, wherein the message view is created at a group messaging layer associated with the sending node.

13. A computer-readable storage medium as recited in claim 8, wherein the message view is associated with a message that is received from an application layer of the sending node.

14. A computer-readable storage medium as recited in claim 8, further comprising the steps of:

creating the message at a sender in an application layer of the sending node;

dispatching the message from the application layer to a group messaging layer of the sending node;

creating the message view and associating the message view with the message;

sending the message with the message view to the recipient nodes;

receiving the updated message view at the sender; and performing a specified application operation based on the updated message view.

15. An apparatus providing updates to views of group members in unstable group communication systems, comprising:

means for a receiving node receiving a group message from a sender associated with a sending node in a network, wherein the group message includes a message view having a counter and an acknowledgment set, wherein the acknowledgment set contains information that identifies one or more receiving nodes to which the group message is directed;

wherein a receiving node of the one or more receiving nodes is a processing node that comprises one or more group members;

means for deferring issuance of an acknowledgment of the group message to the sending node;

means for delivering the group message to the one or more group members;

means for receiving an acknowledgment of the group message from one of the receiving nodes;

means for updating the message view by removing, from the acknowledgment set, information that identifies each receiving node that issues an acknowledgment;

means for determining a number of group members of one of the receiving nodes that received the message;

means for updating the message view by setting the counter equivalent to the number of group members that received the message; and means for providing the updated message view to the sender.

16. An apparatus as recited in claim 15, further comprising the steps of periodically re-transmitting the message to all nodes then currently in the acknowledgment set.

17. An apparatus as recited in claim 15, further comprising the steps of periodically re-transmitting the message to all nodes that fail to acknowledge the message in a specified time.

18. The apparatus as recited in claim 15, further comprising the step of repeating the steps of receiving an acknowledgment of the message from one of the receiving nodes and updating the message view a plurality of times in a specified period.

19. The apparatus as recited in claim 15, wherein the message view is created at a group messaging layer associated with the sending node.

20. The apparatus as recited in claim 15, wherein the message view is associated with a message that is received from an application layer of the sending node.

21. An apparatus as recited in claim 15, further comprising the steps of:
  creating the message at a sender in an application layer of the sending node;
  dispatching the message from the application layer to a group messaging layer of the sending node;
  creating the message view and associating the message view with the message;
  sending the message with the message view to the recipient nodes;
  receiving the updated message view at the sender; and
  performing a specified application operation based on the updated message view.

22. An apparatus providing updates to views of group members in unstable group communication systems, comprising:
  a network interface that is coupled to the data network for receiving one or more packet flows therefrom;
  a processor;
  one or more stored sequences of instructions which, when executed by the processor, cause the processor to carry out the steps of:
    a receiving node receiving a group message from a sender associated with a sending node in a network, wherein the group message includes a message view having a counter and an acknowledgment set, wherein the acknowledgment set contains information that identifies one or more receiving nodes to which the group message is directed;
    wherein a receiving node of the one or more receiving nodes is a processing node that comprises one or more group members;
    deferring issuance of an acknowledgment of the group message to the sending node;
    delivering the group message to the one or more group members;
    receiving an acknowledgment of the group message from one of the receiving nodes;
    updating the message view by removing, from the acknowledgment set, information that identifies each receiving node that issues an acknowledgment;
    determining a number of group members of one of the receiving nodes that received the message;
    updating the message view by setting the counter equivalent to the number of group members that received the message; and
    providing the updated message view to the sender.

23. An apparatus as recited in claim 22, further comprising the steps of periodically re-transmitting the message to all nodes then currently in the acknowledgment set.

24. An apparatus as recited in claim 22, further comprising the steps of periodically re-transmitting the message to all nodes that fail to acknowledge the message in a specified time.

25. The apparatus as recited in claim 22, further comprising the step of repeating the steps of receiving an acknowledgment of the message from one of the receiving nodes and updating the message view a plurality of times in a specified period.

26. The apparatus as recited in claim 22, wherein the message view is created at a group messaging layer associated with the sending node.

27. The apparatus as recited in claim 22, wherein the message view is associated with a message that is received from an application layer of the sending node.

28. An apparatus as recited in claim 22, further comprising the steps of:
  creating the message at a sender in an application layer of the sending node;
  dispatching the message from the application layer to a group messaging layer of the sending node;
  creating the message view and associating the message view with the message;
  sending the message with the message view to the recipient nodes;
  receiving the updated message view at the sender; and
  performing a specified application operation based on the updated message view.

* * * * *

UNITED STATES PATENT AND TRADEMARK OFFICE
CERTIFICATE OF CORRECTION

PATENT NO. : 7,548,972 B2  Page 1 of 1
APPLICATION NO. : 10/279457
DATED : June 16, 2009
INVENTOR(S) : Stephen P Belair et al.

It is certified that error appears in the above-identified patent and that said Letters Patent is hereby corrected as shown below:

<u>ON COVER PAGE</u>

In Section (75) Inventors:

First Inventor: Delete "Stephan" and insert --Stephen--

Signed and Sealed this

Twenty-ninth Day of December, 2009

David J. Kappos
*Director of the United States Patent and Trademark Office*